Figure 1:
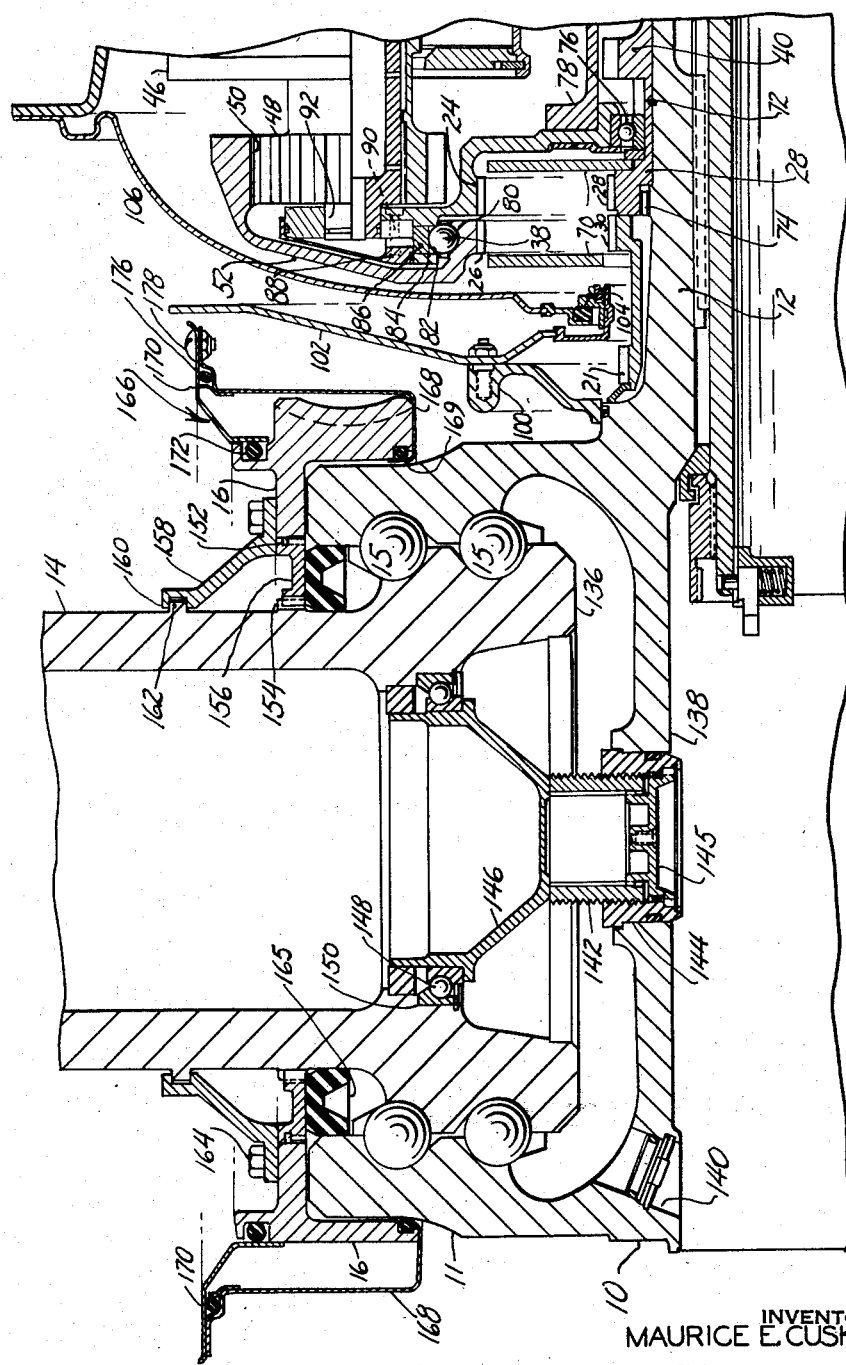

Aug. 12, 1958     M. E. CUSHMAN     2,847,076
CONTROLLABLE PITCH PROPELLER

Original Filed March 6, 1953     4 Sheets-Sheet 1

INVENTOR
MAURICE E. CUSHMAN
BY
ATTORNEY

Aug. 12, 1958  M. E. CUSHMAN  2,847,076
CONTROLLABLE PITCH PROPELLER
Original Filed March 6, 1953  4 Sheets-Sheet 2

INVENTOR
MAURICE E. CUSHMAN
BY
ATTORNEY

Aug. 12, 1958 M. E. CUSHMAN 2,847,076
CONTROLLABLE PITCH PROPELLER
Original Filed March 6, 1953 4 Sheets-Sheet 3

INVENTOR
MAURICE E. CUSHMAN
BY
*Godfrey B. Spier*
ATTORNEY

Aug. 12, 1958  M. E. CUSHMAN  2,847,076
CONTROLLABLE PITCH PROPELLER
Original Filed March 6, 1953  4 Sheets—Sheet 4

INVENTOR
MAURICE E. CUSHMAN
BY
ATTORNEY

United States Patent Office 2,847,076
Patented Aug. 12, 1958

2,847,076

CONTROLLABLE PITCH PROPELLER

Maurice E. Cushman, Verona, N. J., assignor to Curtiss-Wright Corporation, a corporation of Delaware Original application March 6, 1953, Serial No. 340,778. Divided and this application November 21, 1955, Serial No. 548,106

2 Claims. (Cl. 170—160.24)

The present invention relates to propellers for aircraft and is concerned particularly with improvements in the hubs and pitch changing mechanisms thereof. This is a division of application Serial No. 340,778, filed March 6, 1953, now abandoned.

With the development of engines of very large power, there is a concurrent need for propellers to convert the power to aerodynamic thrust and propellers for large engines necessarily become considerably larger than those which have been required in the past for smaller engines. The present invention provides structural arrangements of improved character which enable the design and building of large propellers with a minimum of redundant weight.

The propeller of this invention includes a number of predominant improvements; such as a hub construction of minimum diameter and maximum strength is provided to support the propeller blades for pitch change and against the various loading forces to which they are subject, along with pitch change transmission gearing which lies outside of the basic hub. This enables a minimization of hub bulk and weight since it is unnecessary to provide space within the hub to accommodate pitch change transmission gearing.

A further feature of the invention is the provision of pitch changing gearing externally of the propeller hub along with housing structure to seal the pitch change gearing which is supported by the pitch change gearing and in turn by the propeller blade.

By this arrangement, the pitch change gearing and housing structure, secured to the blade, moves under operating stresses and strains with the blade whereby the housing structure may be made exceptionally light in weight since only minor stresses are imposed thereon. A part of the driving elements of the pitch change mechanism are supported by and mounted on the hub, exteriorly thereof, to provide accessability and to minimize difficulties of accommodating the pitch changing mechanism and its housings to the type of mounting above indicated.

Driving means for the pitch change mechanism in general take a form which has been disclosed previously in Mergen et al. patent application Serial No. 143,636, filed February 11, 1950, now abandoned (243-P), and in Patents 2,640,552 and 2,646,131, but the present invention also incorporates certain improvements in the pitch changing mechanism in bearing arrangements therefor and in the arrangement of the power train for converting part of the force required to drive the propeller into appropriate force for changing blade pitch.

Objects of the invention will become apparent from the foregoing and also from the detailed description which follows and from the drawings forming a part of this specification.

Figure 2:
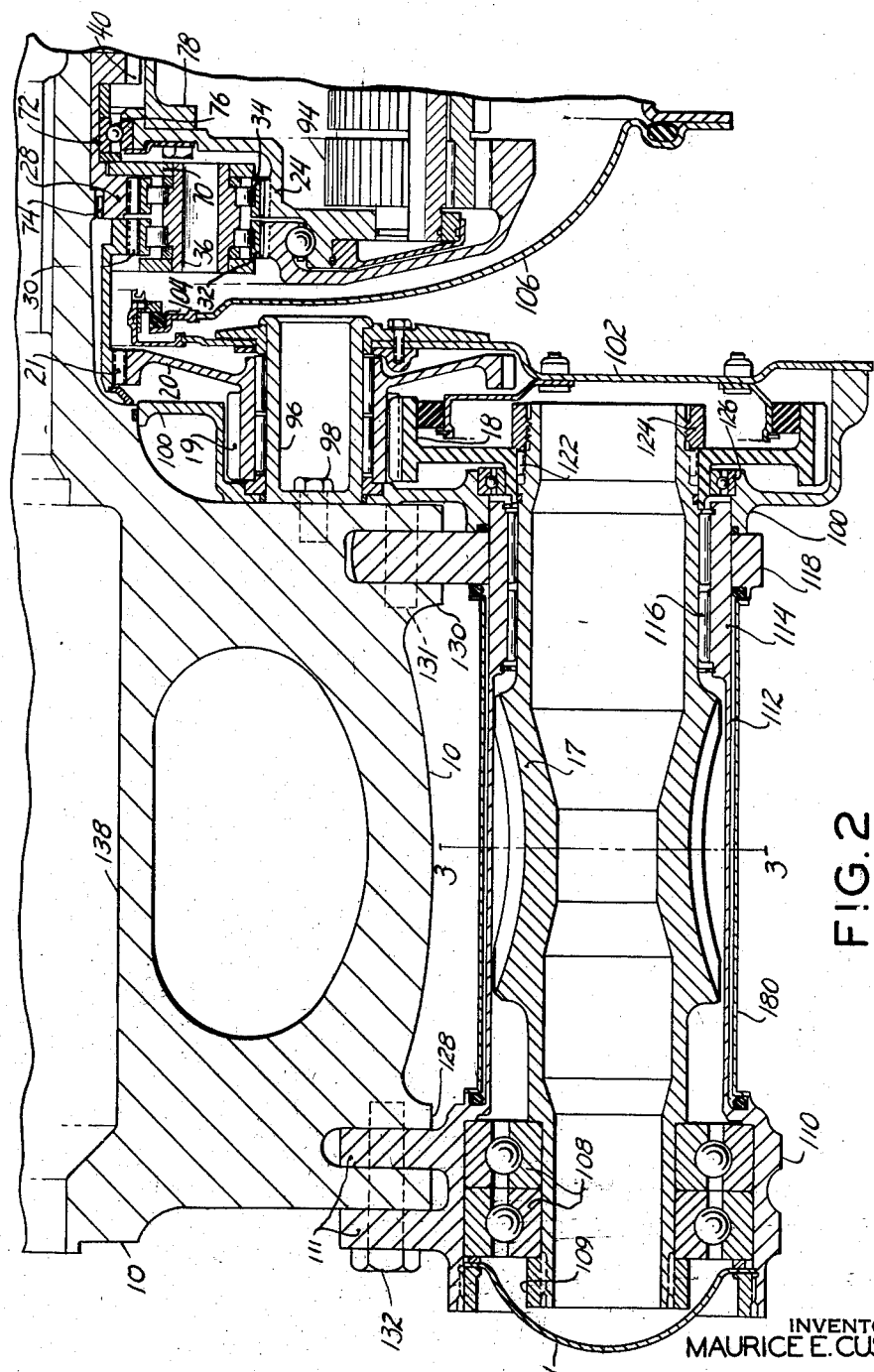
Figure 3:
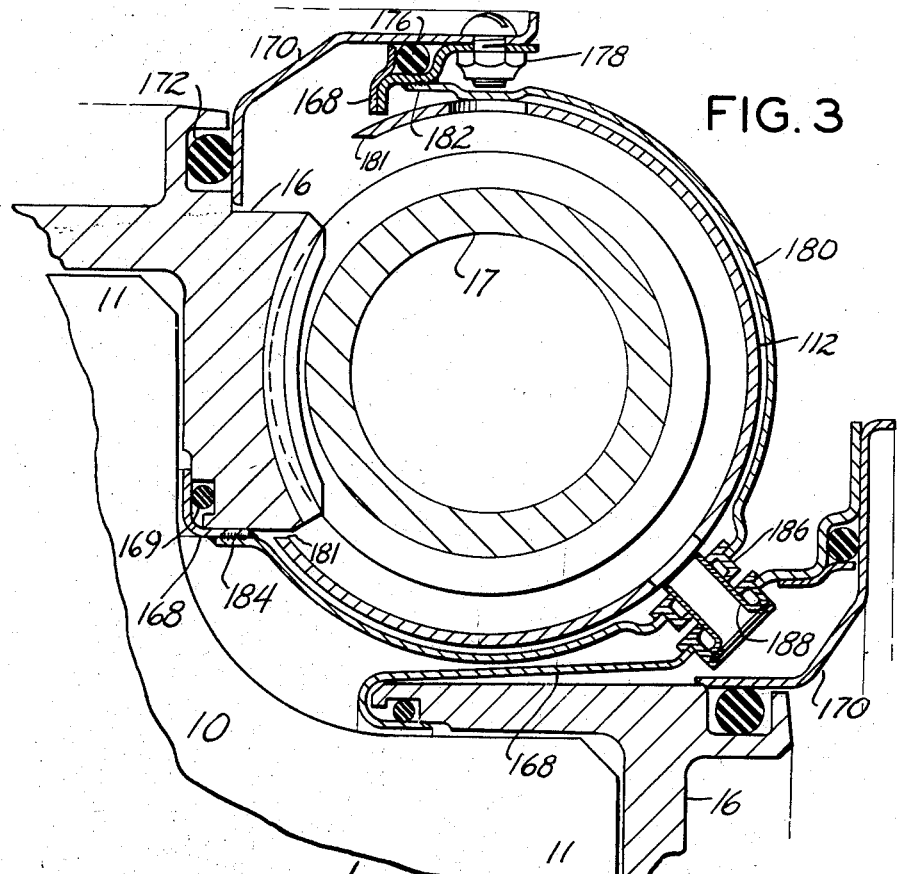
Figure 4:
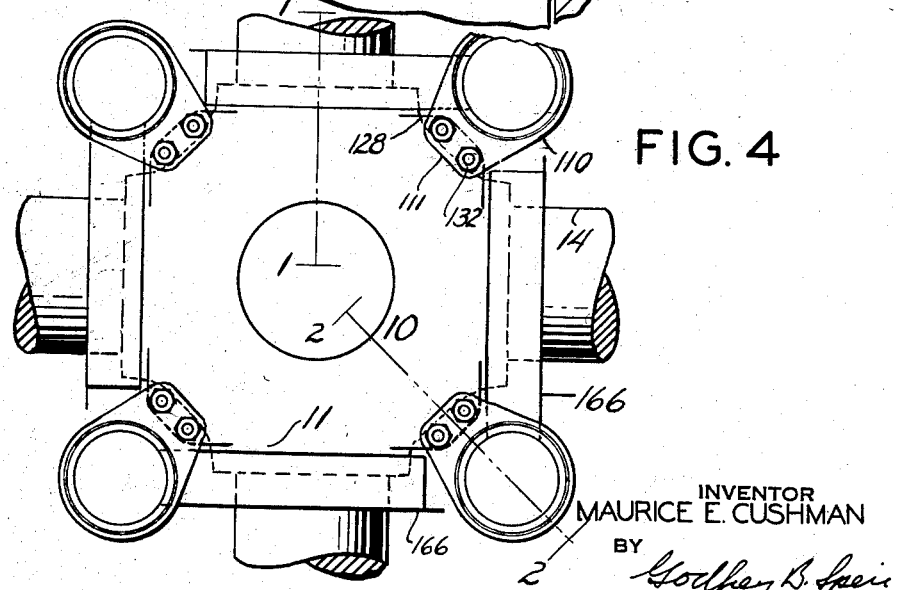
Figures 5, 6:
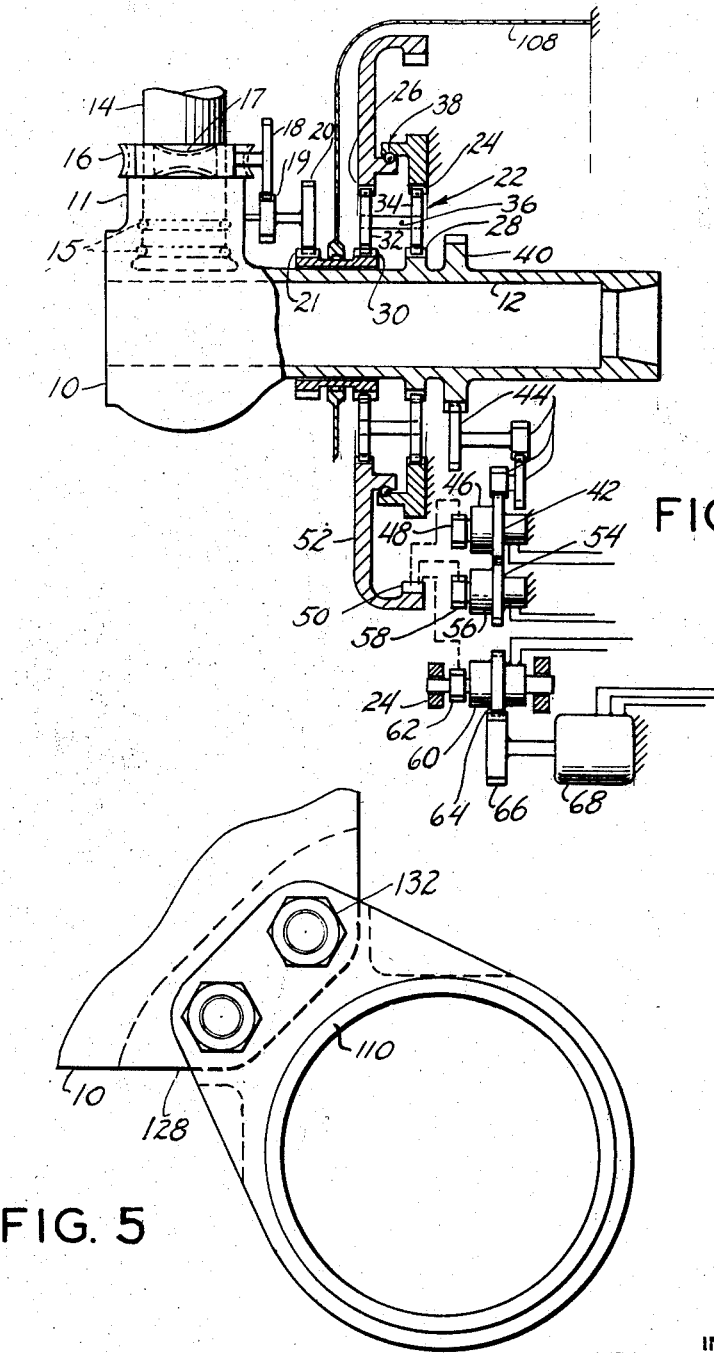

In the drawings, in which similar reference characters designate similar parts:

Fig. 1 is a fragmentary longitudinal section through the propeller hub of the invention and part of the pitch changing mechanism therefor, taken on the line 1—1 of Fig. 4, Fig. 2 is a longitudinal section through another portion of the propeller showing part of the pitch changing power train, taken on line 2—2 of Fig. 4, Fig. 3 is a fragmentary cross-section through part of the pitch changing mechanism, taken on the line 3—3 of Fig. 2, Fig. 4 is an end elevation of the propeller hub and portions of the blades secured therein, Fig. 5 is an end elevation of a fragmentary portion of the structure shown in Fig. 4, and Fig. 6 is a schematic elevation of the propeller and of the pitch changing power gear train.

Reference may first be made to Fig. 6 which shows the general scheme of the propeller. A propeller hub 10 includes blade sockets of which one is shown at 11, the hub further including a rearward cylindrical extension 12 adapted to be mounted upon the propeller shaft of a prime mover. Propeller blades such as 14 are journalled in the hub sockets 11 through anti-friction bearings 15. Secured to each blade radially outward of its socket 11 is a worm wheel 16 engaged by a worm 17 carried in suitable bearings and secured to the propeller hub as will be described later. The worm 17 carries a gear 18 driven by a pinion 19, the latter being coaxial with and journalled on a part of the propeller hub. The gear 20, there being one for each propeller blade, is meshed with a gear 21 coaxial with the propeller shaft and journalled on the sleeve 12 for rotation with and with respect to the propeller hub.

The gear 21, when it rotates at the same speed as the propeller hub holds the blades 14 against pitch change. Means are provided to rotate the gear 21 faster or slower than the propeller hub which rotation rotates the blades for pitch change about their own axes. Pitch control motion for the gear 21 is afforded through transfer gearing generally designated at 22. The transfer gearing includes a fixed ring gear 24, and a control ring gear 26 which, as will be described, may be rotated in either direction or held stationary. The fixed ring gear 24 lies in the plane of a sun gear 28 which is integral with or keyed to the propeller hub sleeve 12. The control ring gear 26 lies in the plane of a sun gear 30 which is integral with the gear 21. Planet pinions 32 mesh with the gears 26 and 30, and planet pinions 34 mesh with the gears 24 and 28, the planet pinions being journalled on spindles 36 carried by a spider which is shown on other figures of the drawings. When the ring gear 26 is fixed from rotation, the planet pinions 32 and 34 will enforce rotation of the gear 30 at the same speed as that of the gear 28 which, as indicated, rotates at propeller speed. Consequently, when no pitch change is desired, the ring gear 26 is held from rotation. If the gear 26 is rotated in one or the other direction, the gear 30 will be rotated in one or the other direction with respect to the propeller hub and consequently, will produce increased or decreased pitch of the propeller blade.

Part of the present invention includes a novel pilot bearing 38 which carries the ring gear 26 on structure forming a part of the fixed ring gear 24. Details of this bearing will be described later.

To impart rotation in either direction to the ring gear 26, a gear train incorporating selectively operable clutches and brake is utilized. The propeller sleeve 12 carries a driving gear 40 which drives a clutch gear 42 through intermediate reduction gearing 44. The gear 42 is on a rotatable housing of a clutch 46 which is selectively operable and which may be engaged to couple the gear 42 to a drive pinion 48. The pinion 48 is in constant engagement with an internal gear 50 carried by a web 52 which is integral with the control ring gear 26.

The gear 42 is meshed with another clutch gear 54 on the rotatable housing of a second clutch 56. Through the clutch, the gear 54 may be coupled to drive a drive pinion 58 which, like the pinion 48, is meshed with the gear 50.

Since the driving elements of clutch 56 is driven by the driving elements of clutch 46, it is obvious that its direction of rotation will be opposite to that of the clutch 46. When the clutch 46 is engaged, power from the gear 40 will be transmitted to drive the gear 50 in one direction. When the clutch 56 is engaged, power from the gear 40 will drive the gear 50 in the opposite direction. The clutches may be of any type but the type preferred includes means for electrical energization.

When neither clutch 46 nor 56 is coupled for driving, a normally non-rotating unit 60 is utilized to hold the gear 50 from rotation. This unit 60 includes a pinion 62 meshed with the gear 50 which may selectively be coupled through the unit 60 to a gear 64. The unit 60 is so arranged that it is engaged when it is not electrically energized and is disengaged when it is electrically energized. The control circuitry is so arranged that the electrical portions of the unit 60 are in series with the common connection to the clutches 46 and 56 so that when either of the clutches 46 or 56 are energized, the unit 60 will be opened to permit rotation of the gear 50. The clutch 60 operates as a brake wehn de-energized to hold the gear 50 from rotation. The gear 64, engages a gear 66, the output member of a feathering motor 68. The motor 68 is of the type which includes a brake to hold the motor output element against rotation when the motor is de-energized. When the motor is energized for rotation in either of two directions, the motor brake is released whereby pitch changing rotation will be imparted to the gear 50 through the engaged clutch unit 60.

For normal pitch changing operation of the propeller when in operation, the motor 68 is de-energized and holds the unit 60 so it may function as a releasable brake, allowing manipulation of pitch of the propeller through energization of the clutches 46 or 56. When it is required to change propeller pitch when the propeller is not rotating or is rotating at a very low speed, the motor 68 will be energized to produce desired pitch change in either direction through the coupled unit 60. The power requirement for pitch change under static or low speed conditions is very moderate so that the motor 68 may be quite small.

On the other hand, when pitch change is required during normal propeller operation, a considerable amount of power is required which, as above described, is derived from the propeller shaft gear 40 and is transmitted through clutches 46 or 56 to provide propeller pitch change.

Figs. 1 and 2 show the propeller hub and a portion of the gearing and pitch change system described above; the reference characters heretofore utilized are applied, where relevant, to the rest of the figures. As shown in Figs. 1 and 2, the spindles 36 of the planet pinions are carried by a spider structure 70. The gears 28 and 40 are carried on a sleeve 72 which is splined as at 74 to the hub sleeve 12. The ring gear 24 is piloted on a bearing 76, on the sleeve 72, so that the propeller shaft may rotate with respect to it, the gear 24 and its associated hub being secured against rotation by an attachment 78 to housing structure which, while carried by the propeller assembly, is secured from rotation with the propeller by a suitable connection to the nose of the power plant, which is not shown.

Reference was previously made to the pilot bearing 38 by which the ring gear structure 52 is piloted on the structure of the ring gear 24. An external race groove 80 is formed on the member 24 and an internal race groove 82 is formed in a portion of the gear structure 52. These parts are assembled over one another and bearing balls are then inserted into the bearing through a port 84 in the member 24. When all of the balls are in place, the port 84 is closed by a plug 86 which is locked in place on the hub by an annular mask 88, secured in place, on the structure 24, by cap screws 90.

The structure 24, outboard of the bearing 38, also serves as a mounting for the ends of shafts comprising parts of the clutches 46, 56 and 60, as exemplified at 92 in Fig. 1. A gear 94 shown in Fig. 2 may be considered as part of the pitch control mechanism of the propeller.

Referring again to Fig. 2, it will be seen that the gears 19 and 20 are driven by the concentric gear 21 and are borne on a journal 96 which is secured as at 98 to the propeller hub 10. The journal 96 also secures a housing structure 100 to the hub 10, the housing embracing gears 18, 19 and 20 and being suitably provided with detachable cover plates 102 to cover the gearing for the retention of lubricant and to protect it from foreign matter. A portion of the housing cover 102 cooperates with an annular seal 104 carried by a cover 106 forming a part of the pitch changing mechanism.

Each worm 17 is provided with integral shaft extensions at its ends, one such extension at the left end of Fig. 2 being supported by radial and thrust bearings, 108 contained in a supporting ring 110 which is secured to the propeller hub through brackets 111. The bearing inner races are secured to the worm extension by a nut 109. The supporting ring 110 carries a cylindrical extension 112 terminating at its rightward end in a thickened annulus 114 forming the outer race for needle bearings 116 in which the rightward shaft extension of the worm 17 is journalled. The annulus 114 is sleeved within a ring bracket 118 which is secured to the hub 10. The rightward end of the worm extension is splined at 122 to receive the gear 18, the gear being secured to the worm extension by a nut 124. The gear 18 is piloted in the housing 110 by a ball bearing 126.

Figs. 4 and 5 may also be referred to to show more clearly the arrangements for attachment of the brackets 111 and 118 to the propeller hub 10. From the several views, it will be noted that the hub 10 is provided with bosses 128 and 130 which are slotted to receive tongues respectively formed on the brackets 111 and 118. The tongues of bracket 111 are secured to the hub boss 128 as by screws 132, and the tongue of bracket 118 is secured to boss 130 by dowels 131.

It will be noted that the worm 17 is supported at its left end in Fig. 2 for thrust and radial loading by the bearings 108, while the needle bearings 116 at the right end of the worm provide only for radial loading. This allows the right end of the worm shaft to float axially to avoid stressing the worm shaft on account of manufacturing tolerances and working strains.

The left end of the member 110 is provided with a cover plate 134 which is secured to the member 110 to confine lubricant in the worm housing and to protect the mechanism from the entrance of impurities.

Referring now to Fig. 1, it will be seen that the worm 16 embraces the shank of the propeller blade 14 outboard of the hub socket 11. The worm wheel 16 is constructed as a complete annulus which may be passed over the butt 136 of the propeller blade prior to its assembly in the hub.

Securement of the worm wheel 16 to the blade, as will be described, is accomplished after assembly of the blade retention bearings 15. The latter comprise two rows of balls which engage directly race grooves formed within each hub socket 11 and race grooves formed directly on each blade butt 136. When the blade is first inserted in the hub, the butt 136 is pushed all the way in to engage the hub socket floor 138. Thereupon, the lower row of balls 15 may be loaded through a port 140 to the blade race, and the upper row of balls are loaded through the space between the outer end of the hub socket and the blade shank to the socket race. Then, the blade is jacked outwardly by a screw jack 142 into the position shown in Fig. 1. The jack 142 is reached from within the hollow of the propeller hub, and is engaged with a nut 144 seated in the socket floor 138. The jack 142 is locked in adjusted position by a splined lock key 145. The outer end of the jack engages an adapter 146 fitted to a pre-loading thrust bearing 148 engaged with a shoulder 150 formed on the inner surface of the hollow propeller blade. When the blade has been jacked outwardly, the bearings 15 are pre-loaded by the jacking operation so that the blade is secured in its operation position.

It was mentioned that the worm wheel 16 was assembled over the propeller blade shank previous to assembly of the blade in the propeller hub. After preparation of worm and wheel assemblies, the worm wheel 16 is brought downwardly as shown to embrace the outer end of the hub socket 11. The inner run of the worm wheel hub is splined at 152. Also, the outside of the blade is provided with a short splined portion 154. Between the splines 152 and 154, a split driving ring 156 is assembled, the driving ring having internal and external splines respectively to engage the splines 154 and 152. Thus, a driving connection is established between the worm wheel 16 and the propeller blade shank. The assembly of worm wheel 16 and spline ring 156 is held in position on the blade shank by a split collar 158 having an outer groove portion 160 engaging a ring 162 formed on the propeller blade shank. The collar 158 is secured to the worm wheel 16 by cap screws 164. With this construction, the collar 158 secures the driving ring 156 in place and secures the worm wheel from outward movement along with propeller blade under the influence of certrifugal force. The blade 14 is sealed to the socket 11 by a packing 165 outboard of the bearings 15, this seal enabling the bearings to be thoroughly lubricated, preventing the escape of lubricant, and preventing the entry of foreign matter into the blade retaining bearings.

As noted previously, the worm wheel 16 is drivably engaged by the worm 17. Since the worm wheel lies wholly outside of the structural portions of the propeller hub, it is necessary to house the wheel and worm to contain lubricant and to prevent entry of foreign matter. For this purpose, an annular housing 166, of sheet metal or the like, is assembled around and is supported by the worm wheel 16.

The housing 166 does not rotate and the worm wheel may rotate around the blade axis within the housing. The housing is supported by an inner flange 168 running around the inner end of the toothed portion of the worm wheel, and sealed with respect thereto at 169.

The assembly of the elements of the housing 166 is made prior to installation of the blade in the hub. The housing 166 also comprises an outer cover portion 170 which is sealed through a suitable seal 172 to the outer portion of the worm wheel, the housing portion 170 and 168 being sealed relative to each other at 176 and being secured to each other at 178.

Where the housing 166 overlaps the worm 17, it is cut away as shown in Fig. 3. At this point, a sheet metal housing 180 embraces the extension 112 the latter also being cut away as at 181 to allow meshing of the worm and wheel. The housing 180 is secured as by brazing or welding to an outer part of the housing 168 at 182 and to an inner part of the housing 168 at 184. This arrangement makes the housing 180 integral with the inner worm wheel housing part 168. Prior to securement of the worm wheel 16 to the propeller blade shank, as previously described, the bearing annulus 112 with its associated parts is assembled within the housing portion 180 and is lowered on the blade shank to enable attachment of the tongues on the members 111 and 113 to the propeller hub bosses 128 and 130.

The housing portion 180 is equipped with a bushing 186 which sealingly engages a hollow ferrule 188 secured to the housing portion 168 embracing the worm wheel 16 of the next adjacent propeller blade. In this arrangement, for a four-bladed propeller, as noted in Fig. 4, all of the worm wheel housings of the several propeller blades are placed in communication with one another to enable transfer and balance of lubricant therebetween. Except for this communication through the ferrule 188, all of the worm wheels and their housings are independently supported by their respective propeller blades and by the worm bearing and housing structures secured to the propeller hub bosses as has been described.

While it is known that the prior art shows propeller constructions wherein pitch changing connections to the propeller blades lie outside of structural portions of the propeller hub, it is believed that this is the first instance where such external pitch changing mechanisms have been completely housed with the housings supported in part by the propeller blades and in part by the propeller hub. It may be noted that the construction herein provided enables the basic structural hub to be designed for optimum stress distribution, avoiding local high stress points which would render the structure less efficient. The hub of the invention herein disclosed enables minimization in the size and bulk thereof since the hub is not required to house gearing and pitch changing mechanism. In propellers where the mechanism is contained within the hub, the mechanism enforces an increase in size of the propeller hub with a consequent increase in its bulk and mass. In the present invention, the hub 10 is intended to be constructed from a one-piece forging, the annular hub sockets being free from interruptions or splits. Likewise, the butt of the propeller blade is an integral structural element promoting maximum strength in the overall structure.

Through the novel disposition of components of the propeller of this invention, tending toward weight reduction and increased strength over structures of the prior art, it is considered that a substantial contribution has been made to the art to enable the fabrication of extremely large propellers adapted for powerplants of the order of 10,000 to 15,000 horsepower.

Though a single embodiment of the invention is shown, the invention may be applied in various forms and embodiments which include changes from arrangements shown. Reference should be made to the following claims which define the limits of the invention.

I claim:

1. In a variable pitch propeller, a hub having a plurality of integral blade sockets, a blade journalled in each socket, a worm wheel secured to each blade outwardly of its hub socket, projections formed on said hub, there being one set of projections for each blade socket, a set of bearing brackets secured to each set of projections, a worm carried by each set of bearing brackets, one worm drivably engaging each worm wheel, a housing for each worm wheel separate from the hub and supported in major part by respective worm wheels and with respect to which said worm wheels are rotatable, and a housing for each worm each supported by one of said sets of brackets, each said worm housing being sealingly secured to the corresponding worm wheel housing.

2. In a variable pitch propeller, a hub having a plurality of integral blade sockets, a blade journalled in each socket, a worm wheel secured to each blade outwardly of its hub socket, projections formed on said hub, there being one set of projections for each blade socket, a set of bearing brackets secured to each set of projections, a worm carried by each set of bearing brackets, one worm drivably engaging each worm wheel, a housing for each worm wheel separate from the hub and supported in major part by respective worm wheels and with respect to which said worm wheels are rotatable, a housing for each worm each supported by one of said sets of brackets, each said worm housing being sealingly secured to the corresponding worm wheel housing, and hollow interconnections between the worm and worm wheel housings of respective worms and worm wheels, to enable interflow of lubricant therebetween during propeller rotation and to enable balance of the lubricant supply in said housings.

References Cited in the file of this patent

UNITED STATES PATENTS

| | | |
|---|---|---|
| 2,224,640 | Bonawit | Dec. 10, 1940 |
| 2,362,913 | McLeod | Nov. 14, 1944 |
| 2,640,552 | Chillson | June 2, 1953 |
| 2,652,123 | Kearns | Sept. 15, 1953 |